Patented July 13, 1937

2,087,000

UNITED STATES PATENT OFFICE 2,087,000

COMPOSITION OF MATTER

Mortimer T. Harvey, East Orange, N. J., assignor to The Harvel Corporation, a corporation of New Jersey No Drawing. Application August 31, 1934, Serial No. 742,282

2 Claims. (Cl. 8—6)

The present invention generally relates to coating materials made from phenolic compound-aldehyde reaction products and glue; and the present invention relates more particularly to a phenolic compound-formaldehyde reaction product and glue composition which is useful for sizing for walls, textiles, paper and so on, for making wall paper washable, for mixing with printing out pastes and the like and a pigment in the textile dyeing art for fixing the pigment on the printed out areas, and for use in the arts generally.

An object of the present invention is to provide a material in the nature of a coating or impregnating liquid which can be set to a condition in which it is flexible, resistant to water, substantially transparent and capable of holding a pigment.

Other objects and advantages of the present invention will appear from the following specification disclosing illustrative examples of compositions of the present invention and of the methods of making and using them and from the appended claims forming part hereof.

A particular and illustrative composition of the present invention is useful in the dyeing art in the place of egg albumen and blood albumen for holding a pigment on textiles and is particularly useful for this purpose in conjunction with strike-out pastes or mixtures which, as is well known, are used for bleaching or killing patterned areas of a dyed background. The stricken-out areas are pigmented to a desired color, often white, the pigment being applied with an adhesive such as egg or blood albumen which adhesive when set is flexible, is transparent enough to properly show the color of the pigment, and is sufficiently resistant to water and other liquids to withstand them when they are used to wash or "dry clean" the textile fabric or articles made therefrom. The pigment and its holding composition can be applied before or after the use of the strike-out paste or mixture but generally is mixed in and applied to the textile with it because this saves several operations and insures that the pigment is applied to and only to the area from which the background color is discharged or stricken-out. Various hydrosulphite compounds are used for discharging or striking-out colors, for example sodium hydrosulphite.

An illustrative example of a method of making a composition adapted for use to hold pigments, for example zinc white, on strike out areas of silk and artificial silk and other textile fabrics is as follows. About 600 grams of a phenolic mixture containing about 30% phenol ($C_6H_5OH$), 50% ortho cresol and 20% meta para cresol; 450 cubic centimeters of commercial 40% formaldehyde solution; and 20 c. c. of a 26% ammonia solution are refluxed for about two hours and then cooled. The resulting resin separates out at the bottom in a sharply distinct liquid layer from which the aqueous layer is removed. To prevent coagulation of the glue with which the resin is used, residual formaldehyde and ammonia are removed from the liquid resin by washing with water or water acidified with acetic acid, or by heating to about 105° C., or by heating with vacuum or by other means or method.

One part of this resin, a somewhat viscous liquid, is thoroughly mixed with about eight parts of an animal glue solution (about 50% solids), and it is then ready for use with strike-out and pigment mixtures and will set to the desired state in the hot box or steam chest used for bringing about the reaction between the strike-out material and the background dye. And the finished product withstands the repeated washings to which the fabric is subjected for removing the reaction products of the dye and the strike-out material. Also, the finished product is flexible even though the strike-out material may contain formaldehyde and/or ammonia which are often used therein.

In place of the phenolic material cited in the above example, ortho cresol can be used in which case forty minutes of refluxing is sufficient to give a liquid resin which can be used with strike-out pastes, the steps of washing being about the same. The proportion of the resin to strike-out paste can be about one of the liquid resin to six of the 50% glue solution.

Another phenolic material which can be used with the glue solution in the practice of the present invention is cardanol, $C_{14}H_{27}C_6H_4OH$, which is obtained by destructive distillation of cashew nut shell liquid. In this illustrative example, about 600 grams of cardanol, 180 c. c. of 40% formaldehyde solution, and 30 grams of sodium hydrosulfite are heated under a reflux condenser for about two hours or until a viscous resin of good body is produced. This resin is separated from the aqueous layer and dehydration conducted with heat and under vacuum. 550 grams of this resin, 2200 grams of animal glue (50% solids in water), 55 grams of sodium hydrosulphite, and 165 c. c. of water are intermixed to produce a composition suitable for applying and holding a pigment on silk or artificial silk or other textile fabric and which can be mixed with and applied with a dye strike-out material.

In the cases of each of the examples above given (and in other variations) the proportions of the resin and glue and the viscosity of the resin and quality of the glue can be varied to suit the flexibility desired in the finished state, to suit the amount, fineness and weight of the pigment to be carried, and to suit degrees desired in other characteristics of the product.

Gelatin and blood or egg albumen emulsion or solution can be used in each of the examples above given in place of the glue solution, but as these are much higher in price than glue the suitability of the glue for the purpose and the resulting decrease in cost removes gelatine and these albumens from commercial competition except in particular cases, and these can be used according to the methods set forth above without any experimentation other than the ordinary checks or trials which a dyer makes in the ordinary course of his work to test new batches of materials as they come in before using them on large and valuable pieces of fabric.

The setting of the materials of the present invention, is produced by heat or by heat and an aldehyde such as formaldehyde. When heat alone is used the glue reacts with phenolic compound-aldehyde reaction material and when heat and additional aldehyde is used the glue can react with the added aldehyde or with this and the phenolic compound aldehyde reaction compound or with both. In any case the latter is in a potentially reactive state when mixed with the glue solution and the two materials go together to form what appears to be a homogeneous dispersion in the water of the glue solution. The water is removed by the same heating step used to set the material of the present invention and, although the nature of the latter in its final state is indeterminate, indications are that heat produces a reaction between the glue and the phenolic compound-aldehyde reaction product.

The examples of phenolic materials above given have been cited as materials useful for applying and holding light colored pigments. Other phenolic materials of course will give the same light colored results, and there are still others which will give the other characteristics but are not suitable for extreme light color results. Among these others is the present grade of commercial cashew nut shell liquid mentioned above as the source of the example cardanol, although cashew nut shell liquid extracted with more care than is used in the old commercial methods used for many years in India will give light color results.

The initial reaction of aldehyde, formaldehyde for example, with the phenolic material can be carried on at the same time as the seting or intermediate reaction of the glue, phenolic material and aldehyde. In such case the glue solution in water and the phenolic material are mixed together and the aldehyde then mixed in and reaction produced at the proper time.

An example of methods of reacting a phenolic material, glue (or its equivalent as set forth above) and an aldehyde comprises adding 15 parts of a 50% solution of glue in water to 150 parts of dehydrated commercial cashew nut shell liquid at about 200° F. after which the water is driven off. About 50 parts of run Congo gum and 75 parts of China-wood oil are added at about 200° F. after which the mixture is brought up to a temperature of 600° F. at which temperature about 2½ parts of litharge are added. The temperature is dropped to about 500° F. and held until the desired body is required after which about 3 parts of manganese resinate are added. The temperature is then dropped to about 300° F. and 300 parts of a petroleum distillate taken between gasoline and kerosene and called Varnoline are mixed in. The glue used in this example has the following analysis taken on the glue basis: jelly strength, 1.02 grams; viscosity 36, millipoises; and a pH of 5.95. The material of this example is suitable for use as a varnish, as a paint vehicle and for general use in the arts.

Insofar as the present invention relates to cashew nut shell liquid the present application discloses matter divided from my copending application Serial Number 592,649, filed February 12, 1932, and the present application as a whole is a continuation in part of said copending application.

Examples of equivalents or materials which can be used in place of the example formaldehyde above given or in place of the formaldehyde and ammonia are paraformaldehyde, furfuraldehyde and hexamethylenetetramine. Also in place of the ammonia a catalyst such as sodium hydroxide, sodium carbonate, hydrochloric acid, or acid naturally occurring in glue, albumen or similar product can be utilized. Also the hydrosulphite used in the discharge or strike-out paste can act as a catalyzer as can ammonia which is also sometimes used. Formaldehyde can be added with the strike-out paste if desired or as it is used in some cases as part of the said paste it can be utilized from that source. It is to be understood however that additional formaldehyde or catalyst are not necessary in every case to get the desired degree of reaction between the glue (or equivalent) and phenolic compound and formaldehyde used to prepare the mixture added to the strike-out paste.

What I claim as new and desire to protect by Letters Patent is:

1. In combination with a printing-out paste for textiles, a pigment and a potentially reactive glue-phenol-aldehyde composition.

2. A fluid material, adapted for use in printing out and printing on textiles, comprising hydrosulphite, pigment and a potentially reactive pigment fixing composition comprising animal glue about 75 to 80 parts and a phenol-aldehyde reaction product 25 to 20 parts.

MORTIMER T. HARVEY.